(12) United States Patent
Bocharov et al.

(10) Patent No.: US 7,246,462 B1
(45) Date of Patent: Jul. 24, 2007

(54) REUSABLE DEVICE FOR RELEASE OF CAUGHT FISHING ACCESSORIES

(75) Inventors: James Bocharov, Baltimore, MD (US); Yuly Mitelman, Stony Brook, NY (US)

(73) Assignee: Grois Inventors Corp, Inc., Glenview, IL (US)

( * ) Notice: Subject to any disclaimer, the term of this patent is extended or adjusted under 35 U.S.C. 154(b) by 0 days.

(21) Appl. No.: 11/367,186

(22) Filed: Mar. 6, 2006

(51) Int. Cl.
*A01K 97/24* (2006.01)
(52) U.S. Cl. ...................................... 43/17.2
(58) Field of Classification Search ............... 43/17.2; D22/149
See application file for complete search history.

(56) References Cited

U.S. PATENT DOCUMENTS 2,560,723 A * 7/1951 Hansen ........................ 43/17.2
2,634,539 A * 4/1953 Brown et al. ................ 43/17.2
D218,823 S * 9/1970 Richins ....................... D22/149
3,601,920 A * 8/1971 Mason, Jr. .................... 43/17.2
3,861,071 A * 1/1975 Nordhagen .................. 43/17.2
4,467,547 A * 8/1984 Chabot ........................ 43/17.2

* cited by examiner

*Primary Examiner*—Kimberly S. Smith
(74) *Attorney, Agent, or Firm*—Charles F. Lind

(57) ABSTRACT

A small reusable lure retriever device formed as one piece metal casting and comprising features to enable the device to slide down onto the fishing line 6 using the gravity force, pull the tied string 7 into the water, rotate and grip the lure 8 mounting fixture while providing robust solution to rescue the caught fishing lures, tackles and bait rigs or different type and size.

5 Claims, 1 Drawing Sheet

REUSABLE DEVICE FOR RELEASE OF CAUGHT FISHING ACCESSORIES

FIELD OF THE INVENTION

This invention relates to a fishing accessory, such as a lure retriever.

BACKGROUND OF THE INVENTION

Lure retriever is an important fishing accessory that enables fisherman to rescue fishing tackle, lure or bait rig when one is caught under water by some debris or branches. Lure retrievers take many forms, all with some kind of mechanism to prevent excessive pull out force being applied on a fishing line. In many cases a special tool is required to release the caught lure. For example, there is a bulky device with strong telescopic rods and metal hook at the end. Another kind of lure retrievers is built into the tackle and enables saving your lure by disengagement from the fishing line and sacrificing the tackle when the pull-out force exceeds the specified value.

There are market opportunities for a lure retriever which combines small size and convenience in usage with its ability to save lures without loosing any fishing accessories. Such a retriever can operate with a specific size of fishing tackle, but it would be desirable to provide a universal device to work with different tackle sizes. It would also be desirable for the lure retriever to have a good compromise between small size and light weight to enable maximum convenience for user from one side and strength and pull-out capability from another side. Lure retriever should withstand multiple drops from a height of 1 meter onto concrete and have a good resistance to corrosive environment.

SUMMARY OF THE INVENTION

According to the present invention, a lure retriever is provided comprising a rear body portion serving as weight and having an opening to fix a rescue cord, hook with a variable profile and pivot for sliding on the fishing line. The pivot connects both hook sides, while one of them has a narrow slot to hang the device onto a fishing line.

In this manner, the heavy portion of the lure retriever will cause it to slide down on a fishing line in a vertical position until the device reaches the caught tackle. Pulling out the cord fixed at the rear portion of the lure retriever will cause its rotation and lead for hook engagement with the tackle. Using a cord of high strength with this lure retriever provides a good solution to rescue expensive fishing accessories.

The device is formed by metal casting that provides the necessary strength, durability and capability to survive multiple drops. This lure retriever is reusable, small and can be easily packed with the other fishing accessories in the fisherman box. The coating prevents the device from corrosion in marine environment.

DETAILED DESCRIPTION OF THE INVENTION

Figure 1:
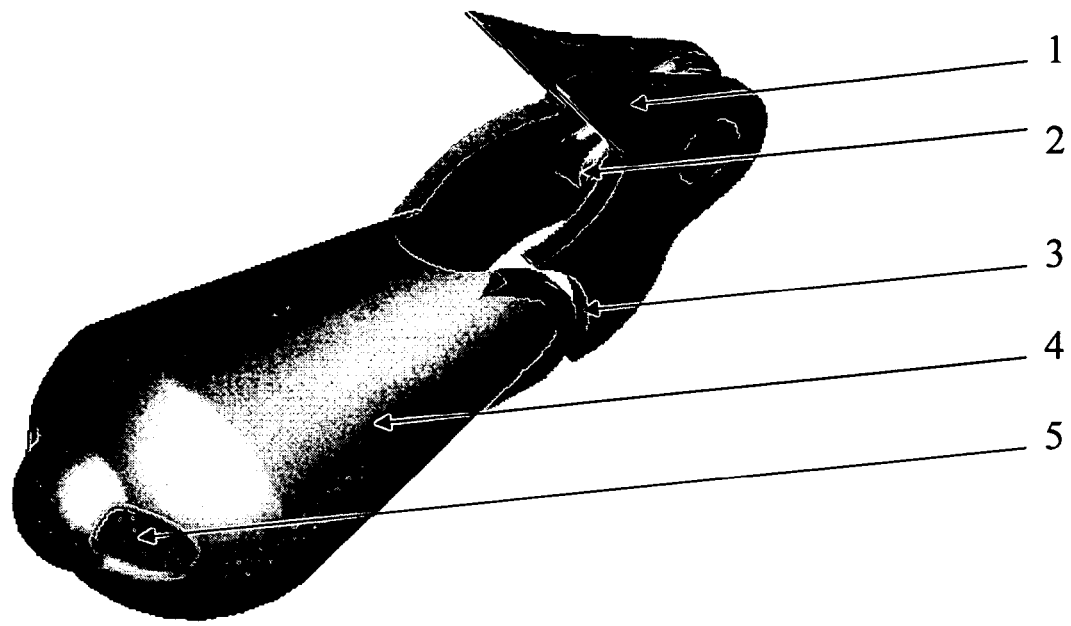
FIG. 1 is an isometric view of a lure retriever in accordance with the invention.
Figure 2:
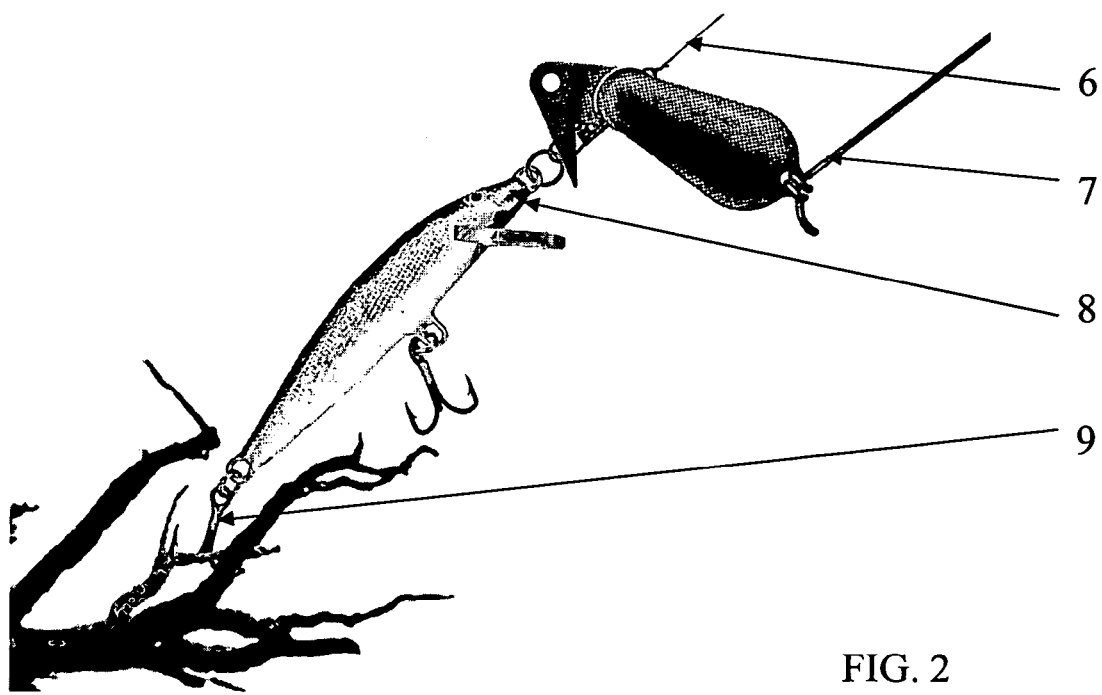
FIG. 2 is a side view illustrating the present invention in operation.

Referring to FIG. 1 and FIG. 2, a lure retriever is shown formed as one-piece metal casting part having hook features 1 and main body portion 4. The main body portion serves as a weight and has an opening 5 to tie a cord 7 to the device. The hook feature 1 is formed by two halves connected by neck 2, which has a central cylindrical surface to enable the device sliding on the fishing line 6 and is also used as a pivot to rotate the device when it reaches the caught lure 7 to be rescued. A narrow slot 3 on one side of the device enables user to hang the lure retriever onto the fishing line 6. Hook feature 1 has a variable width that provides the device capability to be used with different size of fishing tackles, bait rigs and lures.

The release process requires nothing more than this fixture tied with a string 7 through an integrated hole 5 in the rear end of the part. Fisherman will hang the fixture on the strained fishing line 6 with the caught tackle 9 using narrow slot 3 in the part's center portion. The device will slide on its smooth cylindrical neck surface 2 on the fishing-line 6 and go up to the lure 8 under the water due to the gravity force as a result of part weight. When fixture stops to advance, it means it reached the lure 8.

In the position shown in the FIG. 2 the lure retriever has reached the caught lure 8 under the water. Pulling cord 7 tied to the opening 5 the user will cause the device to rotate around pivot 2 until engagement with the lure 8. Location of center of mass guarantees this rotation. Width reduction between the hook sides will provide a good match and reliable grip with various lures and their fixtures.

Fisherman pulls the string back, thus causing the fixture to rotated and release the lure. Then, both fishing line and string could be reeled on. Released fishing accessories can be reused for fishing. The fixture can be removed from water and wait for the next rescue task.

The invention claimed is:

1. A lure retriever for recovering a fishing lure snagged under water and connected via a front lure mounting fixture and an inclined fishing line of limited tensile strength to a fisher person above water, the retriever comprising an elongated body having a density greater than water, said body having
an upper end with a rounded central neck suited to engage the fishing line for supporting the body for sliding by gravity along the fishing line until being proximate the lure mounting fixture and snagged lure;
a lower end spaced from the body upper end operable to cause the elongated retriever body to be oriented vertically when suspended on the fishing line; and
spaced sides extending between the upper and lower ends defining an opening adjacent the underside of the central neck for the fishing line;
a pair of hooks located on the body upper end and protruding transversely away from the rounded neck and having adjacent horizontally separated faces oriented to line up on opposite sides of the fishing line and to overlie opposite side portions of the line and lure mounting fixture; and
means on said lower body end spaced from the neck for connecting a strong recovery cord suited upon being tensioned for rotating the retriever about the neck to a non-vertical orientation that causes the hooks to straddle and become secured relative to said lure mounting fixture and snagged lure, wherein tensioning said recovery cord with a force potentially greater than the limited capacity of the fishing line can provide retrieval of the snagged lure.

2. A lure retriever according to claim 1, further comprising the adjacent faces of said hooks converging toward one another to the narrowest separation adjacent the rounded neck.

3. A lure retriever according to claim 1, further comprising one of said spaced body sides having a slot therein for passing the fishing line into the opening and against the body upper end neck for suspending the retriever on the line.

4. A lure retriever according to claim 3, further comprising the adjacent faces of said hooks converging toward one another to the narrowest separation adjacent the rounded neck.

5. A lure retriever according to claim 4, further wherein the means for connecting a strong recovery cord lure is through an opening in the lower body end.

\* \* \* \* \*